United States Patent [19]
Finley

[11] Patent Number: 5,947,549
[45] Date of Patent: Sep. 7, 1999

[54] CONVERSION FILLER PANEL STRUCTURE

[76] Inventor: Alfred L. Finley, 2201 Hidden Creek Rd., Ft. Worth, Tex. 76107

[21] Appl. No.: 09/042,098

[22] Filed: Mar. 13, 1998

[51] Int. Cl.⁶ .................................................... B60R 13/02
[52] U.S. Cl. ...................................... 296/183; 296/190.08
[58] Field of Search .................................... 296/37.6, 183, 296/190.08; 280/770, 850

[56] References Cited

U.S. PATENT DOCUMENTS

| | | | |
|---|---|---|---|
| 2,745,678 | 5/1956 | Morgan | 280/850 |
| 4,126,349 | 11/1978 | Nelson | 296/37.6 |

FOREIGN PATENT DOCUMENTS 2-70581  3/1990  Japan ...................................... 280/850

*Primary Examiner*—Dennis H. Pedder

[57] ABSTRACT

A pair of conversion filler panel structures are used in the conversion of a conventional pick-up truck to a service vehicle. In the conversion, the pick-up truck box is removed and replaced with a service body which exposes irregular and unsymmetrical rear corners of the pick-up truck cab. Each conversion filler panel structure is secured to the rear surface of the cab to cover a rear corner and present a smooth surface continuous with the side of the cab.

4 Claims, 2 Drawing Sheets

CONVERSION FILLER PANEL STRUCTURE

FIELD OF THE INVENTION

This invention relates to utility vehicles and more particularly to conversion filler panel structures used in standard pick-up trucks which are converted to service vehicles.

BACKGROUND OF THE INVENTION

Many suppliers of service vehicles purchased conventional commercial pick-up trucks from the vehicle manufacturers and convert the pick-up trucks to service vehicles. In this conversion, the pick-up truck box is replaced with a service body. Service vehicles have a wide spread usage especially in the utility fields.

When the pick-up truck box is removed and replaced with a service body, the front of the service body is spaced from the rear of the pick-up truck cab thereby exposing the irregular and unsymmetrical rear corners of the pick-up truck cab.

SUMMARY OF THE INVENTION

It is an object of this invention to provide conversion filler panel structures for use in converting a conventional pick-up truck to a utility vehicle.

More specifically, it is an object of this invention to provide conversion filler panels for covering the rear corners of a pick-up truck cab, the conversion panel structures simulating the exterior surface of the cab.

The filler conversion panel structures are formed of plastic and are shaped and constructed to simulate the exterior surface of the truck cab. The conversion filler panel structures include an exterior panel and an attachment panel, the latter being secured to the rear surface of the pick-up truck cab.

DESCRIPTION OF THE PREFERRED EMBODIMENT

Figure 1:
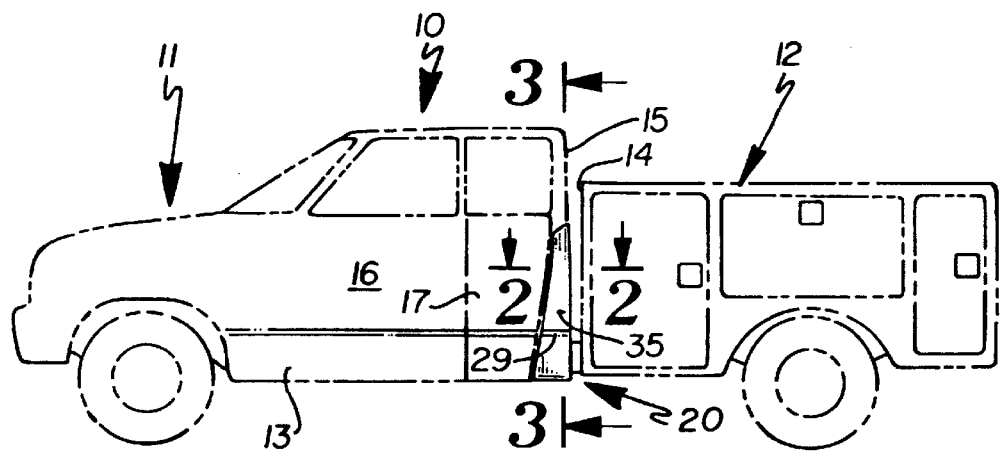
FIG. 1 is a side elevational view of a novel conversion filler panel structure depicted in mounted relation on a service vehicle cab, the service vehicle being depicted in dotted line configuration.

Referring now to the drawings and more specifically to FIG. 1, it will be seen that a conventional service vehicle, designated generally by the reference numeral 10, has the novel conversion panel 20 attached thereto. The service vehicle 10 is depicted in dotted line configuration and includes a cab 11 and a service body 12 mounted on a chassis 13. The service body 12, is of the type typically used by utility companies or similar servicing entities. The service body 12 has a front surface 14 which is spaced from the rear surface 15 of the cab 15. It is pointed out that the service body 12 is mounted on the chassis of a conventional pick-up truck which has had the conventional pickup truck box removed. Thus the cab and the chassis of the service vehicle 10 are of conventional pick-up truck construction.

Figure 2:
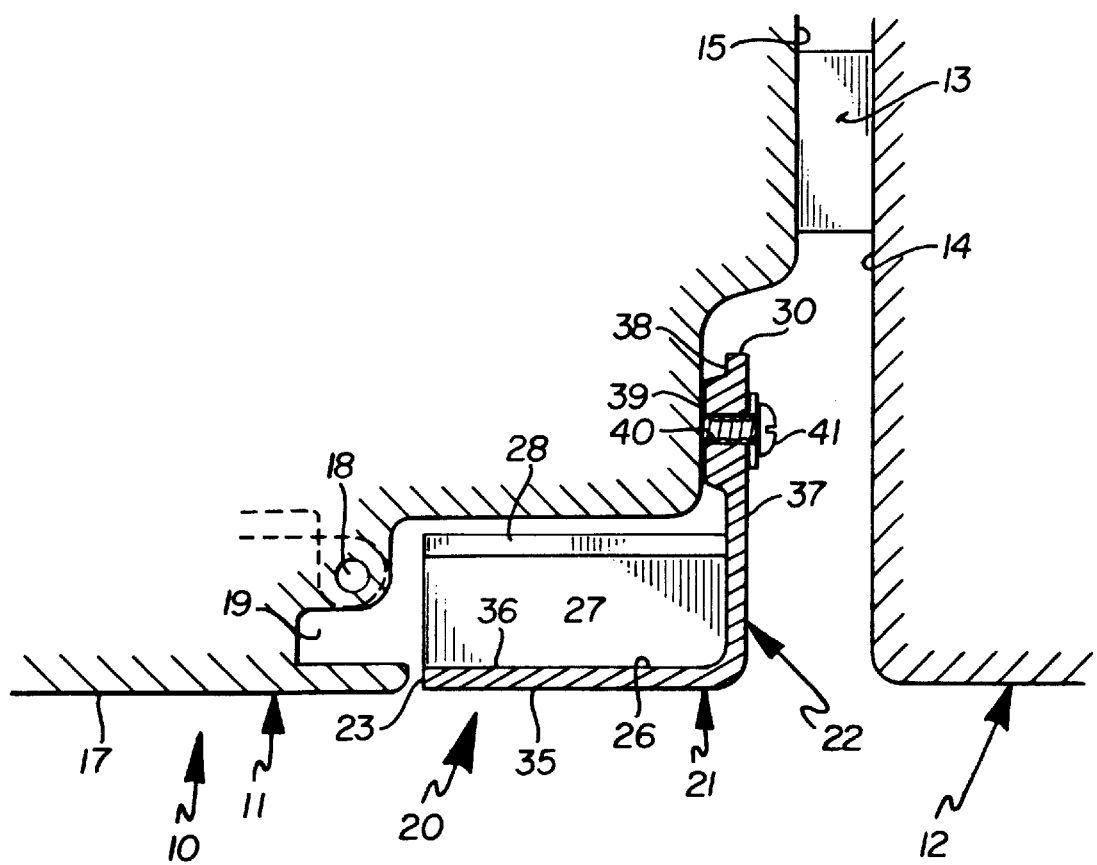
FIG. 2 is a cross-sectional view taken approximately along line 2—2 of FIG. 1 and looking in the direction of the arrows.

The side surface of the cab 11 is defined in part by the doors located on each side of the cab including the small door 17 located rearwardly of the conventional side door. Each small side door 17 is secured to the cab body by hinge 18 as best seen in FIG. 2. It will also be noted that the rear corners of the cab 11 have irregular shaped, unsymmetrical rear corners 19. These rear corners are exposed when the conventional pick-up truck box is removed and replaced with a service body 12. The conversion filler panel structures 20 cover these unsymmetrical corners and simulate a continuation of the sides of the cab 11.

Each conversion filler panel structure 20 includes a side panel 21 which is integral with a rear panel 22 that extends in substantially rectangular relation from the side panel 20. The conversion filler panel structures 20 are formed in a molding process using an open cavity mold system. The panels are formed of fiber glass and a layer of gelcoat. The panel structure also includes a second or inner layer consisting of a clear resin and continuous chopped fiber glass strands. The composition of each panel structure is 70% resin with 30% fiber glass content.

Figure 3:
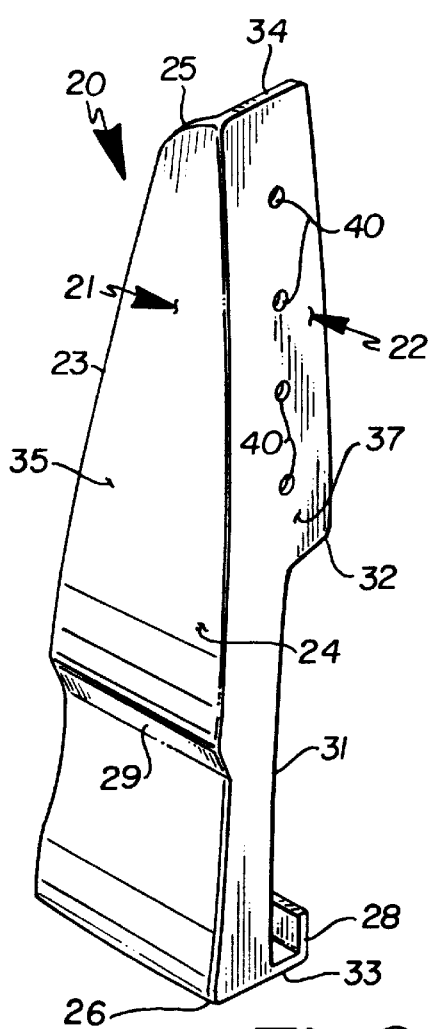
FIG. 3 is a rear perspective view of a conversion panel structure looking generally along the cutting plane lines 3—3 of FIG. 1.
Figure 4:
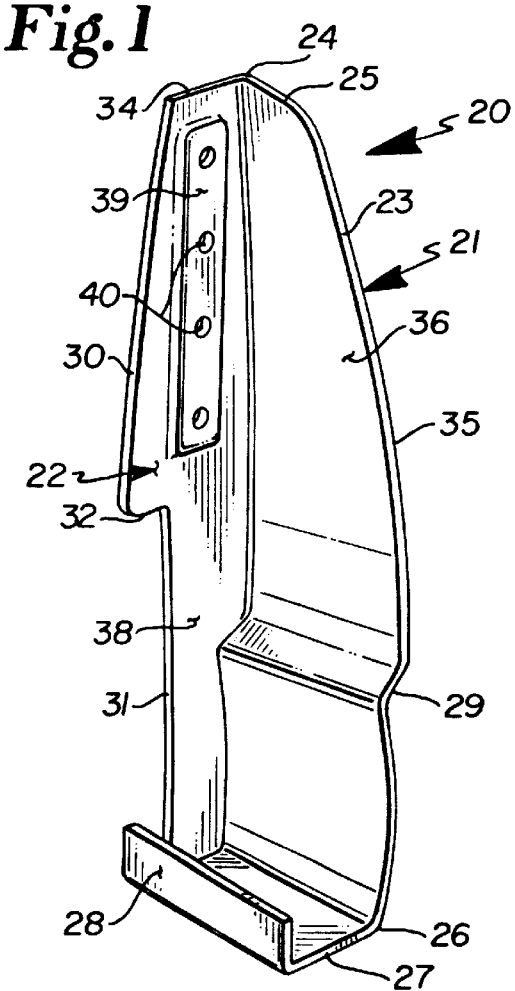
FIG. 4 is a front perspective view of a conversion filler panel structure illustrated in FIG. 3.

It will be seen that the side panel 21 flares downwardly and outwardly and has a generally overall triangular configuration. The side panel 21 has a front edge 23, a rear edge 24, and a top edge 25 that merges upwardly from the front edge. Each side panel also has a bottom or lower edge 26 having an inturned horizontal flange 27 integrally formed therewith and extending inwardly therefrom. The inturned flange 27 terminates in an upturned lip 28. The side panels for each filler panel structure 20 also includes an offset portion 29 which extends inwardly and downwardly as best seen in FIGS. 3 and 4. The offset portion is located intermediate the top and bottom edges of the side panel.

The rear panel of each conversion filler panel structure is of generally flat configuration and includes an upper inner edge portion 30, a lower inner portion 31 and an intermediate offset inner edge portion 32. It will be noted that the upper inner edge 30 extends downwardly and outwardly while the intermediate inner edge portions extends inwardly and is continuous with the upper and lower inner edge portions. The outer edge portion of the filler panel is also defined by the rear edge portion 24 of the side panel 21. The lower edge 33 of the rear panel is integral with the inturned flange 27 and the upper edge of the rear panel is substantially straight and continuous with the upper edge 25 of the side panel 21.

The side panel 21 has a smooth outer surface 35 and an inner surface 36. The rear panel 22 of each conversion filler panel structure 20 has a rear surface 37 and a front surface 38. It will be noted that the front surface 38 of the rear panel 22 has a molded-in attachment strip 39 which extends from adjacent the upper edge of the rear panel to a point located just above the intermediate offset inner edge portion 32. This molded end attachment strip 39 has a plurality of vertically spaced apart openings therein which accommodate bolts 41.

When the conversion filler panel structures 20 are secured to the cab 11, bolts 41 will pass through the opening 40 and secure the rear panel 22 to the rear surface 15 of the cab. The outer surface 35 of the side panel 21 of each conversion filler panel structure will be disposed in a co-planar disposition with the outer surface of the side of the pick-up truck cab as best seen in FIG. 2. With this arrangement the side panel of the filler panel structure forms a continuation of the side of the cab. The side panel will be offset downwardly in the manner of the side of a cab. The inturned flange and lip of each conversion filler panel structure imparts strength to the panel structure.

It will therefore be seen that I have provided novel conversion filler panel structures for use in converting commercial pick-up trucks to service vehicles. The conversion filler panel structures cover the irregular, unsymmetrical rear corners of the pick-up truck cab and generate an appearance of smooth symmetrical rear corners of the truck cab thereby concealing any appearance of conversion.

What is claimed is:

1. In a pick-up truck converted to a service vehicle including a chassis and a cab, a service body replacing the conventional pick-up truck box and secured to the chassis rearwardly of the cab, the cab having sides-defined in part by side doors and having irregular, unsymmetrical rear corners, a pair of conversion filler panel structures secured to the cab in overlying covering relation with respect to the rear corners of the cab, each panel structure including a side panel having an exterior surface forming a continuation of the exterior surface of a side of a cab, and a rear panel integral with said side panel and extending therefrom at substantially right angles thereto, and means securing the rear panel to the rear surface of the cab.

2. The invention as defined in claim 1 wherein said side panel has a lower edge, an internal flange integral with said lower edge and extending inwardly therefrom, and an upturned flange integral with said internal flange.

3. The invention as defined in claim 1 wherein each conversion filler panel is formed by a molding process and has a composition of 70% resin and 30% fiberglass.

4. The invention as defined in claim 3 wherein said rear panel has a molded-in vertical extending attachment strip on one surface thereof, said securing means comprising bolts extending through openings in said attachment strips.

* * * * *